US010979222B2

(12) United States Patent
Lanc et al.

(10) Patent No.: US 10,979,222 B2
(45) Date of Patent: Apr. 13, 2021

(54) RESILIENT SECRET SHARING CLOUD BASED ARCHITECTURE FOR DATA VAULT

(71) Applicant: LEADING SOFTWARE LIMITED, Edinburgh (GB)

(72) Inventors: David Lanc, Edinburgh (GB); Lu Fan, Edinburgh (GB); Lachlan Mackinnon, Keith, Dufftown (GB); Bill Buchanan, Edinburgh (GB)

(73) Assignee: LEADING SOFTWARE LIMITED, Edinburgh (GB)

( * ) Notice: Subject to any disclaimer, the term of this patent is extended or adjusted under 35 U.S.C. 154(b) by 15 days.

(21) Appl. No.: 15/383,540

(22) Filed: Dec. 19, 2016

(65) Prior Publication Data
US 2017/0163418 A1    Jun. 8, 2017

Related U.S. Application Data

(60) Division of application No. 15/216,176, filed on Jul. 21, 2016, now abandoned, which is a continuation of
(Continued)

(51) Int. Cl.
*H04L 9/08* (2006.01)
*H04L 9/14* (2006.01)
*H04L 29/06* (2006.01)

(52) U.S. Cl.
CPC ............ *H04L 9/0894* (2013.01); *H04L 9/085* (2013.01); *H04L 9/14* (2013.01); *H04L 63/20* (2013.01);
(Continued)

(58) Field of Classification Search
CPC ......... H04L 9/0894; H04L 9/14; H04L 63/20; H04L 2209/08
See application file for complete search history.

(56) References Cited

U.S. PATENT DOCUMENTS

| 6,430,118 B1 * | 8/2002 | Anderson | G06F 11/1076 369/30.1 |
| 9,027,149 B2 * | 5/2015 | Koike | G06F 21/6218 726/26 |

(Continued)

FOREIGN PATENT DOCUMENTS

EP    2 693 358 A1    2/2014

OTHER PUBLICATIONS

Slim Trabelsi et al., "Sticky policies for data control in the cloud," Privacy, Security and Trust (PST), 2012 Tenth Annual Intl. Conference on IEEE, pp. 75-80, (Jul. 16, 2012) XP032237152.
(Continued)

*Primary Examiner* — Linglan E Edwards
(74) *Attorney, Agent, or Firm* — BakerHostetler

(57) ABSTRACT

A method of securely storing data including: providing, within a secure data storage system, a plurality of secret sharing methods for selection and identifying a striping policy for storage of the data, in accordance with input preferences. The data can be split into N secret shares according to a secret sharing method, the selection being determined by the striping policy, wherein a threshold number, T, of such shares is sufficient to recover the data, where T is less than N, generating metadata associated with the data, the metadata identifying the selected secret sharing method and storing the metadata within the secure data storage system and writing the secret shares to storage that includes storage outside the secure data storage system, such that, when at least T shares are retrieved, the metadata can be recalled to identify the selected secret sharing method for recovery of the data.

23 Claims, 8 Drawing Sheets

Related U.S. Application Data application No. PCT/GB2016/052009, filed on Jul. 1, 2016.

(60) Provisional application No. 62/188,058, filed on Jul. 2, 2015.

(52) U.S. Cl.
CPC ...... *H04L 2209/08* (2013.01); *H04L 2209/24* (2013.01)

(56) References Cited

U.S. PATENT DOCUMENTS

| | | | | |
|---|---|---|---|---|
| 10,228,867 | B2* | 3/2019 | Vervaet | G06F 16/24556 |
| 2007/0096954 | A1 | 5/2007 | Boldt et al. | |
| 2008/0083037 | A1* | 4/2008 | Kruse | G06F 21/88 |
| | | | | 726/27 |
| 2008/0137857 | A1* | 6/2008 | Bellare | H04L 9/321 |
| | | | | 380/255 |
| 2009/0177894 | A1* | 7/2009 | Orsini | H04L 9/321 |
| | | | | 713/193 |
| 2009/0320041 | A1* | 12/2009 | Noguchi | G06F 3/0646 |
| | | | | 718/105 |
| 2010/0058476 | A1* | 3/2010 | Isoda | G06F 21/6227 |
| | | | | 726/26 |
| 2010/0217986 | A1 | 8/2010 | Schneider | |
| 2010/0299313 | A1* | 11/2010 | Orsini | H04L 63/20 |
| | | | | 707/652 |
| 2011/0264717 | A1 | 10/2011 | Grube et al. | |
| 2013/0331113 | A1* | 12/2013 | Grosman | H04W 24/02 |
| | | | | 455/452.1 |
| 2014/0013439 | A1* | 1/2014 | Koike | G06F 21/6218 |
| | | | | 726/26 |
| 2014/0281793 | A1* | 9/2014 | Patapoutian | G06F 11/1048 |
| | | | | 714/758 |
| 2015/0134797 | A1* | 5/2015 | Theimer | H04L 41/24 |
| | | | | 709/223 |
| 2015/0220400 | A1* | 8/2015 | Resch | G06F 11/1076 |
| | | | | 714/6.2 |
| 2016/0011936 | A1* | 1/2016 | Luby | G06F 3/067 |
| | | | | 714/6.2 |

OTHER PUBLICATIONS

Adi Shamir: "How to share a secret," Communications of the ACM, Association for Computing Machinery, Inc., vol. 22, No. 11, pp. 612-613 (Nov. 1, 1979) XP058098024.

Hugo Krawczyk Ed—Stinson D.R.: "Secret Sharing Made Short," Advances in Cryptology (Crypto), Santa Barbara, Aug. 22-26, 1993, Proc. of the Annual Intl. Cryptology Conf. (Crypto, Berlin, pp. 136-146 (Aug. 22, 1993) XP019194050.

Rabin M.O.: "Efficient Dispersal of Information for Security, Load Balancing, and Fault Tolerance," J. of the Assoc. for Computing Machinery, ACM, vol. 36, No. 2, pp. 335-348 (Apr. 1, 1989) XP000570108.

International Search Report, dated Oct. 5, 2016, and Written Opinion issued in parent International Application No. PCT/GB2016/052009.

* cited by examiner

RESILIENT SECRET SHARING CLOUD BASED ARCHITECTURE FOR DATA VAULT

CROSS-REFERENCE TO RELATED APPLICATIONS

This application is a divisional of U.S. application Ser. No. 15/216,176, filed Jul. 21, 2016, which is a continuation of International Application No. PCT/GB2016/052009, filed Jul. 1, 2016, which claims the benefit of U.S. Provisional Application No. 62/188,058, filed Jul. 2, 2015, the entire contents of which are fully incorporated herein by reference.

FIELD OF THE INVENTION

This invention relates to the secure storage of data.

BACKGROUND

Computing has witnessed a change from on-premises infrastructure to convenient, on-demand network access to a shared pool of configurable computing resources that can be rapidly provisioned and released with minimal management effort or service provider interaction, also known as Cloud Computing.

Cloud computing provides enterprises with benefits such as saving on capital and operational costs, improving scalability and flexibility and reducing the carbon footprint. However, Cloud computing also presents a number of disadvantages such as data security and reliability issues.

In Cloud computing, on-premises architectures within organisations have simply been scaled-out into the Cloud, with the addition of encryption. This methodology has been shown to be weak from many aspects, especially related to: trusted administrator access; lack of proper access control; Advanced Persistent Threat (APT); and in the loss of private keys. Many systems are often protected with symmetric key encryption methods, where the key is protected by a password or encrypted using public key encryption. Along with this, anyone with System Administrator access can gain access to the encrypted content. The current encryption methods in the Cloud often suffer where the loss of a single encryption key can result in large-scale data loss.

Many organisations use the same methods of robustness and failover as they do within their internal systems. With the Cloud, there is a risk of a major outage in parts of the Cloud resulting in denial of service. More severely, outage can cause business shut down as there is no alternative means of accessing data. Beyond this, the user's privacy is usually jeopardised as Cloud service providers cache, copy and archive users' data, which can easily be retrieved, used and misused by miscreants, competitors or court of law even when the owner seems to have deleted them.

U.S. Pat. No. 8,423,466 describes a transaction system that sits between a bank or payment provider and a user and acts as a secure, trusted system for arranging payment once a transaction has been fulfilled and only once the identities of both users have been authenticated and appropriate checks have been completed. The system allows a user to transact with merchants over numerous different channels, using a single authentication means to interact with the system, thereby to be authenticated and arrange a payment, without having to reveal financial details to the merchant. The system provides multi-channel, consistent anti-fraud measures and validation services to users to ensure that the other users involved in the transaction are who they claim and are transacting within allowed limits.

Since many systems have been breached by a compromise involving the loss of a private key, one method to overcome this problem is to use keyless encryption. In one example, keyless encryption involves breaking the data into secret shares which can be distributed amongst those who have the rights to the data. If any data elements are accessed, it will not be possible to recover the original data until the other relevant shares are available.

Secret sharing schemes have been proposed for data splitting and reconstruction, thereby providing data security in a keyless manner. Such algorithms include Adi Shamir's Perfect Secret Sharing Scheme (PSS), Hugo Krawczyk's Secret Sharing made short or Computational Secret Sharing scheme (CSS) and Rabin's Information Dispersal Algorithm (IDA), among others. These algorithms break a secret into chunks called (T-out-of-N) threshold where N is the total number of shares and T is the number required to recover the secret. Fewer than the threshold number (T) of shares cannot recover the secret. The performance overhead of the different secret sharing schemes, at increasing thresholds and increasing data sizes shows varied behaviours, and has restricted the advancement of secret sharing schemes in use.

Another consideration taken into account when using a Cloud based storage system is ensuring that it is survivable. That is to say, the Cloud based storage system is able to securely store critical information and ensure that it persists, is continuously accessible, cannot be destroyed and is kept confidential. Survivable Cloud storage systems entrust data to a set of Clouds. Relying on a single Cloud Storage Provider (CSP) is subject to confidentiality and availability risks. As such, the data should be fragmented and then distributed among multiple CSPs.

SUMMARY OF THE INVENTION

According to a first aspect of the invention, a method of securely storing data is provided. The method comprises: providing, within a secure data storage system, a plurality of secret sharing methods for selection; identifying, a striping policy for storage of the data, in accordance with input preferences; split the data into a plurality, N, of secret shares according to a selected one of the plurality of secret sharing methods, the selection being determined by the striping policy, wherein a threshold number, T, of such shares is sufficient to recover the data, where T is less than N; generate metadata associated with the data, the metadata identifying the selected secret sharing method; store the metadata within the secure data storage system; and write the secret shares to storage. The storage preferably includes storage outside the secure data storage system. When at least T shares are retrieved, the metadata can be recalled to identify the selected secret sharing method for recovery of the data.

The secret sharing methods preferably include methods with relatively high security but relatively low resilience and methods with relatively high resilience but relatively low security and wherein the selection of the striping policy is based on preferences that are translated into security and resilience preferences.

The secret sharing methods may include methods or algorithms with relatively high T/N and relatively low T/N. An interface is provided to enable a user or administrator to input preferences that are translated into selection of a striping policy.

The secret sharing methods preferably include different secret sharing algorithms selected from the group that includes: perfect secret sharing scheme (PSS); computational secret sharing (CSS); information dispersal algorithm; and Reed-Solomon encoding combined with encryption.

The policy preferably translates a user preference for security, resilience and/or performance into a selection of method/algorithm.

Each share is preferably written to an independent store, at least some of which are outside the secure storage system, such as: a public cloud; a private cloud; a non-SQL data store; and a file server.

In accordance with a second aspect of the invention. A system for securely storing data is provided. The system comprises: a secret sharing module adapted to provide a plurality of secret sharing methods for selection, each method arranged to split the data into a plurality, N, of secret shares wherein a threshold number, T, of such shares is sufficient to recover the data, where T is less than N; a policy module adapted to determine a policy for storage of the data, in accordance with input preferences, wherein the method selected by the secret sharing module for splitting the data is determined by the policy module; a metadata module for generating and storing metadata associated with the data, the metadata identifying the selected secret sharing method; and a memory and storage interface for writing the secret shares to storage such that, when at least T shares are retrieved from storage, the metadata can be recalled to identify the selected secret sharing method for recovery of the data.

Also provided is a computer program product comprising program code which, when executed by a computer, causes the computer to perform the above method.

In accordance with a further aspect of the invention, a method of securely storing data is provided that comprises: fragmenting (otherwise referred to as striping) the data into a plurality, N, of secret shares, typically of equal size, according to a secret sharing algorithm, wherein a threshold number, T, of such shares is sufficient to recover the data, where T is less than N; splitting each share into data particles of equal size; writing the particles to storage such that the particles of each share are written to independent storage means corresponding to that share, each particle being identified only by an identifier unique within its respective storage means. In this manner, loss of an independent storage means or loss of a particle within that independent storage means preferably results in loss of at most one share.

The method may comprising pre-storing particles of dummy data within each storage means and/or may comprise performing a clean-up process for each storage means, whereby particles that exist in the storage means are identified as having expired. Particles of data and particles of dummy or expired data preferably co-exist in the storage means.

The method may further comprise identifying a persistence policy for storage of the data in accordance with input preferences, whereby a set of storage means is selected for storage of the data in accordance with the persistence policy and/or in accordance with a sensitivity attribute associated with the data. Some polices may include restrictions on attributes of the storage means that are to be selected to make up the set of storage means. Some polices may be defined for user selection that include different attributes for each of the storage means that are to be selected to make up the set of storage means. Such attributes may include identifiers of storage providers and geographical locations of the storage means. Polices may include user latency preference and/or may include duplication of one or more shares across plural independent storage means and/or may include trustworthiness of the storage means. "Trustworthiness" is not merely an abstract concept in the mind of the user—it may be defined in technical features such as by electronically signed certification, and/or may include challenge and response with a certification server.

The method preferably included monitoring the performance of each storage means for improvement of selection of storage means according to persistence policy, (e.g. adjusting the selection of storage means based on performance in response to the monitoring).

In accordance with a further aspect of the invention, a secure storage system is provided comprising: an input interface for receiving data for storage; a secret sharing module for fragmenting the data into a plurality, N, of secret shares of equal size according to a secret sharing algorithm, wherein a threshold number, T, of such shares is sufficient to recover the data, where T is less than N; and a persistence module for splitting each share into data particles of equal size and for writing the particles to storage such that the particles of each share are written to independent storage means corresponding to that share, each particle being identified only by an identifier unique within its respective storage means.

Also provided is a computer program product comprising program code which, when executed by a computer, causes the computer to: receive data for storage; fragment the data into a plurality, N, of secret shares of equal size according to a secret sharing algorithm, wherein a threshold number, T, of such shares is sufficient to recover the data, where T is less than N; split each share into data particles of equal size; and write the particles to storage such that the particles of each share are written to independent storage means corresponding to that share, each particle being identified only by an identifier unique within its respective storage means.

DETAILED DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Figure 1:
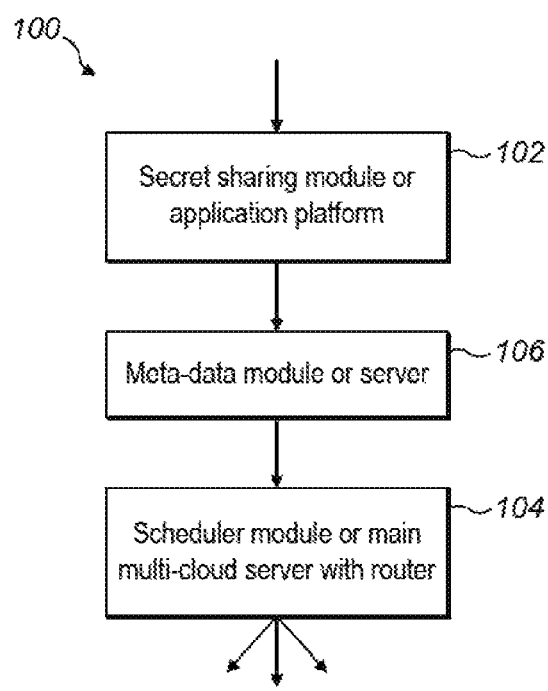
FIG. 1 is a high level diagram illustrating, generically, elements of a storage system in accordance with embodiments of the invention.

FIG. 1 shows an architecture which supports a secret sharing scheme in a multi-cloud environment 100 can be viewed as having an application platform 102 (having a secret sharing module that will be described), a main multi-cloud proxy server (with router) 104 and a metadata server 106. The metadata server 106 is illustrated as being connected between the application platform 102 and the main multi-cloud proxy server 104 illustrating that metadata can be associated with data passing between the application platform 102 and the main multi-cloud proxy server 104 in each direction.

The function of the application platform 102 is to: determine access structure; encode secrets; send secrets to the main multi-cloud proxy server 104 for distribution to multi-cloud service providers, and reconstruct the secret shares when recovered. The main multi-cloud proxy server (with router) 104 splits and distributes encoded shares to the multi-cloud based on a pre-determined access structure and manages the fail-over protection of shares. The metadata server 106 includes the functionality of: user management; server management; session management; policy management; and file metadata management.

The architecture may also have a multi-cloud proxy server for gathering shares and reconstructing secrets as well managing break-glass data recovery. There may be sub-Routers to create a path between a cloud service provider (CSP) (considered here as front-end) with other cloud service providers (considered here as the back-ends), thereby creating a quick and alternative recovery path for all the shares.

At the application platform 102, the data owner determines N and T values and, using both, calls up the application to be used and selects an algorithm of choice based on an evaluation after a successful sign-in to the system (e.g. as described in U.S. Pat. No. 8,423,466), and an access level is determined. The values for N and T are not directly selected by the user, but such values are prescribed for attributes selected by the user (e.g. "very secure," "very resilient" etc.) Translation of selected attributes into a selected algorithm (with or without selected encryption) and parameters for that algorithm is automated.

In addition to selection of algorithm and parameters based on user selected attributes (security, resilience, overhead cost), the choice of algorithm and encryption can further be based on data size and performance and indeed performance for a given data size).

The selected algorithm may have a 3-out-of-5 access structure or a 4-out-of-10 or a 2-out-of-5. The encoded data is sent to the local main multi-cloud proxy server with router 104 for onward dissemination to the CSPs. The proxy splits the encoded data according to a secret-sharing scheme determined access structure, and distributes each share over the Internet to different CSPs (or distributes some to CSPs and others to local/in-house storage).

The retrieval process is similar to the storage process as the metadata server (106) helps to keep track of the siblings of the shares. The proxy retrieves enough corresponding shares from the cloud service providers. This retrieval involves authentication to the cloud providers. The retrieved shares are sent back to the application platform (102), which decodes them and verifies their authenticity before reconstructing the data. The system is capable of a break-glass data recovery through the local multi-cloud proxy server in case of emergency after which a clean-up should be performed at the end of the activities for record purposes.

The design incorporates unique features in a multi-cloud environment as it uses secret sharing schemes to implement keyless encryption. This is done by breaking the secret into chunks in such a manner that less than T shares cannot recover the secret, thus using it for data distribution in object storage system. This is also used to implement safety destruct with equal divided shares. The incorporation of a self-destructive system solves the problem of cloud users' privacy, as there is no way a user's data can be accessed, copied, cached or used without the data owner's consent within a pre-determined time-frame, because all data and their copies are destroyed or become unreadable after a user-specified time, without any user intervention.

The self-destructive system defines two modules; a self-destruct method object; and survival time parameter for each secret key part. In this case, a secret sharing algorithm is used to implement share distribution in object storage system so as to ensure safe destruct with equally divided shares. Based on active storage framework, object-based storage interface will be used to store and manage the equal divided shares.

The use and implementation of threshold systems in cloud services are deliberate acts towards implementing a failover protection in the model. In normal circumstances, all the service providers are used in share storage as well as secret reconstruction, but in an extreme desperate situation, 2-out-of-5 can be made redundant. That is to say if 2-out-of-5 CSPs fail, data/secret storage and reconstruction are still possible.

The use of a second local multi-cloud proxy server and sub-routers are for the implementation of a break-glass data recovery. With the sub-routers and the second multi-cloud server, a route is established to and from all the CSPs. Having decided on a 3-out-of-5 access structure, only 3-out-of-5 CSPs are required to store and reconstruct the secret in an emergency situation. By this feature, the concept of total business shut down or denial of service may not exist in using this model, though the number of CSPs required is dependent on the secret sharing algorithm of choice in times of secret reconstruction.

A break-glass data recovery system can be implemented using one of the proxy servers. An access to the multi-Cloud proxy server entails access to particular CSPs that provide access to all other CSPs (e.g. CSPs I, 3 and 5 provide a link to CSPs 2 and 4). In this example, these are different independent CSPs of the same or different storage architectures. The relationships are linked for redundancy but are mutually exclusive in terms of storage architectures.

Access to particular CSPs ensures a quick recovery of shares in order to reconstruct the secret as it is a quick link to all other CSPs. Moreover, following the access structure, such access ensures the possibility of reconstructing the secret in an emergency situation. This is a useful feature, as there could be a period of cloud outage, and in such situation, data recovery could be done from 3-out-of-5 Cloud service providers being used for data storage. That is to say, if 2 out of the 5 cloud service providers fail, data recovery is still possible in such an extreme condition.

The proposed architecture can provide the following:

1. fast and efficient data/key distribution to multi-cloud service providers;

2. keyless encryption and therefore increased data security;

3. data owner's privacy by implementing a self-destructing data system (SeDaS), as it meets all the privacy-preserving goals;

4. support, through SeDaS, for securely erasing files and random storage in drives (Cloud, FIDD or SSD) respectively;

5. backup operational mode in which the function of 5 CSPs can be assumed by 3 CSPs when 2-out-of-the-5 CSPs become unavailable either through failure or scheduled down time; and 6. break-glass data recovery.

Figure 2:
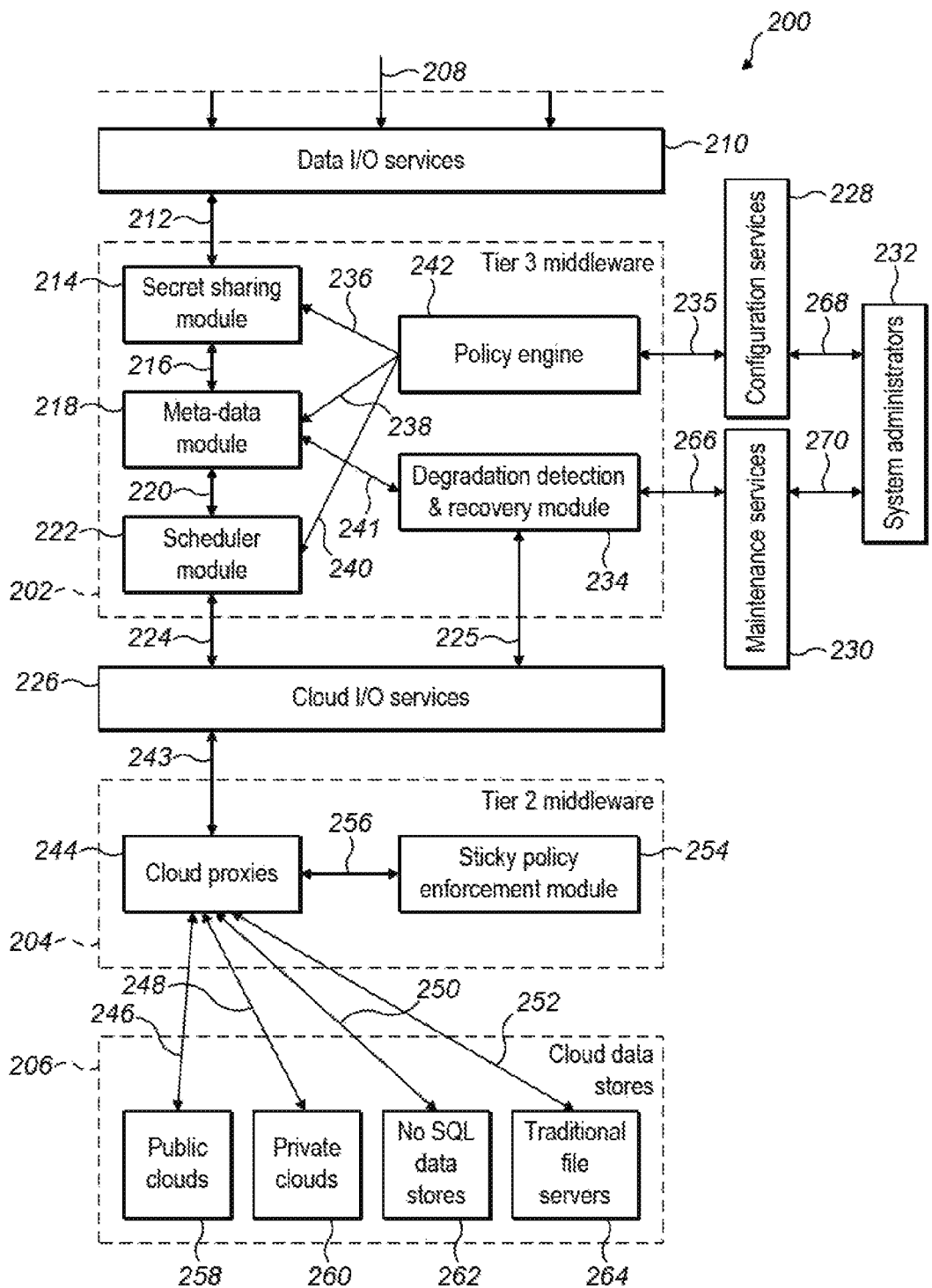
FIG. 2 is a more detailed diagram of a storage system, referred to as a survivable cloud storage system (SCSS) architecture.

FIG. 2 shows a Survivable Cloud Storage system (SCSS) architecture 200. It is shown as having three parts—tier 3 middleware 202, tier 2 middleware 204 and cloud data stores 206.

The tier 3 middleware 202 comprises a secret sharing module 214, a meta data module 218, a scheduler module 222, connected across interfaces 216 and 220 and connected to a source of data 208 via interface 212 and to cloud I/O services 226 via interface 224. It has a policy engine 242 coupled to each of elements 214, 218 and 222 via software interfaces (APIs) 236, 238 and 240 and has a degradation detection and recovery (DDR) module 234 coupled to metadata module 218 via software interface 241.

The tier 2 middleware comprises a cloud proxies module 244 and a sticky policy enforcement module 254 connected across interface 256. The cloud proxies module 244 is connected to the cloud I/O services 226 via interface 243.

Sticky policies are described in general terms in Sticky Policies for Data Control in the Cloud by Slim Trabelsi and Jakub Sendor, 2012 Tenth Annual International Conference on Privacy, Security and Trust, where it is explained that sticky policies are security and privacy constraints that are permanently "attached" to data. It is described that when sensitive information is sent to the cloud, it is stored with the sticky policy attached to it (for storage of the sticky policy in the cloud). It is also described that an entity that wants to decrypt data needs to comply with the sticky policy in order to receive a decryption token from a certification authority.

In the preferred embodiment of the present invention, all that is sent to the cloud attached to the data is sufficient information (e.g. an ID) to permit the system to identify the sticky policy that has been applied and from which the data can be reconstructed when sufficient shares have been retrieved. I.e. the details of the sticky policy remain as metadata in the metadata module 218 while forever remaining associated with the data. This fragmentation provides greater security of the overall secure storage system and obfuscates the details of the sticky policy, encryption method and other attributes related to any data fragment stored in the cloud by the present invention Cloud data stores 206 comprise public clouds 258 connected to the cloud proxies 244 via interface 246; private clouds 260 connected to the cloud proxies 244 via interface 248; NoSQL data stores 262 connected to the cloud proxies 244 via interface 250 and/or traditional file servers 264 connected to the cloud proxies 244 via interface 252. Different ones of these different types of store may be available and used in different circumstances, as will be described. It is particularly useful, as will be explained, to arrange that more than one type of data store is used for a particular set of shares of a shared secret.

The policy engine 242 is connected to configuration services 228 via interface 235. The configuration services are connected to system administrators 232 via interface 268. The DDR module 234 is connected to a maintenance module 230 via interface 266. The maintenance module 230 is connected to system administrators 232 via interface 270.

The design and implementation of an access control sub-system can be quite flexible, and largely depend on specific requirements from an application domain. Access control issues are assumed to be addressed on a higher level (e.g. as described in U.S. Pat. No. 8,423,466), rather than being an integral part of the SCSS architecture. In other words, the underlying data I/O services behave as a relying party of the access control sub-system, and expect data producers and consumers to present valid security tokens as proof of authorised data operations.

The tier 3 middleware 202 will now be described.

Data I/O Services 210 provide fundamental create, read, update and delete (CRUD) operations 208 to data producers and consumers. Service-Oriented Architecture (SOA) is adopted to provide good interoperability that allows a wide range of clients developed on different software and hardware platforms to store and retrieve any data files conveniently.

Data producers and consumers may access the data I/O services 210 in slightly different ways. A data producer is regarded as the owner of the data files that it has previously stored in the SCSS architecture, and thus its CRUD operations on these files should be permitted right away. In this circumstance, the data I/O services 210 only need to authenticate a data producer's identity using a security token issued by the access-control sub-system. However, a data consumer must access the data I/O services 210 via a policy enforcement point (PEP), which guarantees that the data consumer has been authorised by the data owner to carry out a CRUD operation over a certain file.

When the data I/O services 210 receive a new data file from a client, it assigns a unique ID to the file, registers the ownership, and splits the file into multiple secret shares using the secret sharing module 214 (as shown by line 212). Then, a variety of meta-data will be generated by the meta-data module 218, such as time-stamps, unique share IDs, and mappings from the share IDs to further tracking and management information (as shown by line 216). It is noticeable that some of the meta-data is maintained by the meta-data module 218 internally, while some others will be attached to the shares themselves, i.e., the sticky policies that will be handled by the tier-2 middleware 204 later on for share life-cycle management purposes. Next, the shares are passed on to the scheduler module 222 (as shown by line 220), which dynamically distributes the shares to Cloud data stores 206 through lower level Cloud I/O Services 226 (as shown by line 224). The sticky policy attached to the share/fragment may only relate to the unique ID for that share/fragment. The unique ID can then be used to locate the share/fragment and access the rest of the metadata maintained in the meta-module 218. This ensures that the complete metadata cannot be accessed by only having access to the share/fragment in the cloud data stores 206.

When the data I/O services 210 receive a reading request for a data file 208, it firstly resolves the file ID into corresponding share IDs using the meta-data module 218 and looks up the tracking information for each of the shares; secondly, it asks the scheduler module 222 to recover these shares from the cloud data stores 206—this operation will terminate when a sufficient number of shares have been collected; and last, it reconstructs the original data file using the secret sharing module 214 and returns the file to the client.

The selection by the secret sharing module 214 of the correct shared secret algorithm is described below. The secret sharing module may alternatively be referred to as a "crypto-fragmentation" module.

The processing of an updating request is similar to writing a new file 208, while it is possible either to delete the old file, or to keep it for versioning or auditing purposes. To process a delete request 208, the data I/O services 210 resolve the file ID into corresponding share IDs, and then ask the scheduler module 222 to delete all or enough of the shares to obfuscate recreation from the cloud data stores 206 and recalibrate indices related to dummy data.

Referring now to configuration services 228, the front end of the configuration services provides a graphical user interface for system administrators 232 to set up various runtime policies that control the behaviours of the tier 3 software modules 202, as shown by lines 235 to 240. The back end of the services is a policy engine 242, which interprets and enforces the policies in real-time. It is preferred that the configuration and maintenance services are segregated between the different middleware tiers, for increased segregation of duties and security.

The configuration policies dictate the following aspects of the SCSS architecture 200. For the secret sharing module 214, the policy defines the secret sharing schemes that are supported by the system, the hashing and encryption functions to be used by each individual scheme, the threshold T, and the total number of shares N. A policy may configure the secret sharing module 214 to apply a single scheme with static parameters to all the data files, or to apply a number of schemes with dynamic parameters flexibly so as to meet different application requirements on security, reliability and performance.

For the meta-data module 218, the policy defines the types and levels of meta-data that the system should generate and maintain. For example, a configuration policy may demand of a comprehensive audit trail about all the changes made to a certain file. As a result, the meta-data module 218 would override the updating and deleting operations so as to keep all historical versions of the targeted file throughout its life-cycle. For the scheduler module 222, the policy defines the scheduling strategies that are supported by the system. For example, whether the system should apply round-robin scheduling to optimise load-balancing, or apply Byzantine fault-tolerance scheduling to optimise dependability, or apply social trust scheduling to optimise performance.

Referring now to maintenance services 230, these facilitate system administrators to configure the degradation detection & recovery (DDR) module 234, as shown by line 266. The DDR Module 234 is concerned with the integrity and retrievability of the secret shares that were distributed to the Cloud data stores 206. It obtains share IDs and corresponding tracking information from the Meta-Data Module 218 (as shown by line 241), and periodically challenges the Cloud data stores 206 using a proof-of-retrievability (PoR) protocol (as shown by line 225). In the case that a share was identified to be corrupted or lost, the DDR module 234 will inform the meta-data module 218, which in turn generates a substitute share using the secret sharing module 214 and uploads the share using the scheduler module 222. A maintenance policy should specify technical details about the PoR protocol, as well as the interval for the DDR module 234 to carry out the checks.

Tier 2 middleware 204 will now be described.

The tier 2 middleware 204 implements CSP specific cloud proxies which provide lower level share-oriented CRUD operations and query functions through consistent cloud I/O services interface, as shown by line 243.

Cloud proxies 244 provide both horizontal and vertical abstractions over a wide range of cloud data stores 206, as shown by lines 246 to 252. Horizontal abstraction refers to the compatibility with diversified CSPs under different management and/or control (e.g. Microsoft™, Amazon™, Google™, Rackspace™, etc). A cloud proxy 244 instance serves as a client of a CSP's proprietary API, and handles the input and output of secret shares efficiently. Vertical abstraction refers to the capability of a cloud proxy 244 instance to utilise a CSP's storage services on different levels appropriately. For example, the cloud proxy for Windows Azure™ may store secret shares using the blob service, yet store associated meta-data, such as sticky policies, using the table service. This is because the blob service is more cost-effective, and the table service provides better performance on queries. Similarly, the cloud proxy for AWS may store secret shares in S3, yet store meta-data in DynamoDB™, and so on. Such optimisations should be carried out by a cloud proxy 244 automatically, and be completely transparent to tier 3 middleware 202. The sticky policies are preferably stored with their associations to secret shares within the SCSS 200, where performance, cost and latency benefits result.

Another component of tier 2 middleware 204 is the sticky policy enforcement (SPE) module 254, which is an independent software process that constantly scans sticky policies of the secret shares and fulfils the security constraints, as shown by line 256. For example, the SPE module 254 deletes a secret share when it is expired according to the sticky policy.

Referring now to cloud data stores 206, the SCSS architecture 200 shall support as many types of cloud data stores as possible in order to provide high flexibility, scalability, reliability and cost-effectiveness. Public clouds 258 and private clouds 260 can be used in combination, and if necessary, the system can expand to include NoSQL data stores 262 (e.g. Cassandra and Druid™), or even traditional file servers 264. A dedicated cloud proxy needs to be implemented to bridge a particular data store and the unified cloud I/O service interface.

Figure 3:
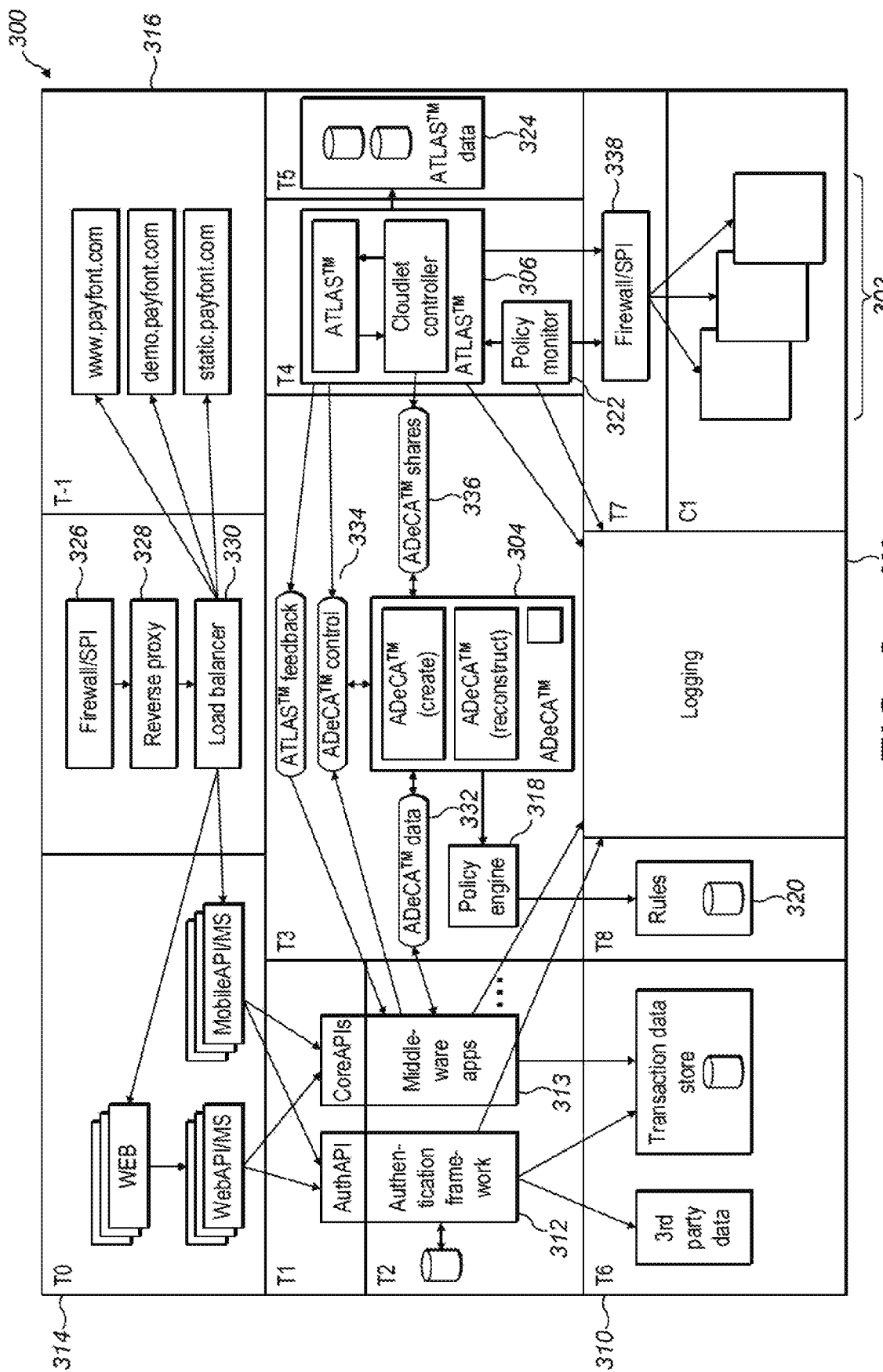
FIG. 3 illustrates tiered software components of a further embodiment.

FIG. 3 shows a resilient secret sharing cloud-based architecture for a data vault 300. The architecture provides a system that allows data to be stored securely in a plurality of storage means 302. The system comprises a secret sharing module 304 (which may be regarded as an Anonymous and Distributed encryption Cloud Architecture—ADeCA™— engine); a persistence engine 306 (which may be referred to as ATLA™); the plurality of storage means 302; a logging unit 308; a transaction data unit 310; an authentication framework unit 312 with middleware apps 313; a web application unit 314 and a website unit 316. Each of these units is a module of software with or without its own independent hardware and they interface as shown in FIG. 3 across interfaces (which may be APIs).

The secret sharing module 304 is coupled to a secret sharing policy engine 318 and a policy rules database 320. (318 and 320 could alternatively be a single module). The persistence engine 306 is coupled to a persistence policy monitor 322 and a persistence data store 324. The authentication framework unit 312 and the web application unit 314 can be as described in U.S. Pat. No. 8,423,466 which is hereby incorporated in its entirety by reference. The website unit 316 comprises a firewall 326, a reverse proxy 328 and a load balancer 330.

In operation (after authentication), data 332 is sent from the middleware apps 313 to the secret sharing module 304 for splitting into secret shares and storing. The secret sharing module 304 receives control signals from secret sharing control 334 and also receives a secret sharing policy for the data from the secret sharing policy engine 318 according to the policy rules database 320. The secret sharing module 304 then splits the data into secret shares 336 which are forwarded to the persistence engine 306.

The persistence engine 306 receives the secret shares from the secret sharing module and distributes the secret shares, according to the persistence policy engine 322 and the persistence data store 324, via a firewall 338, to the plurality of storage means (e.g. cloud stores) 302.

Figure 4:
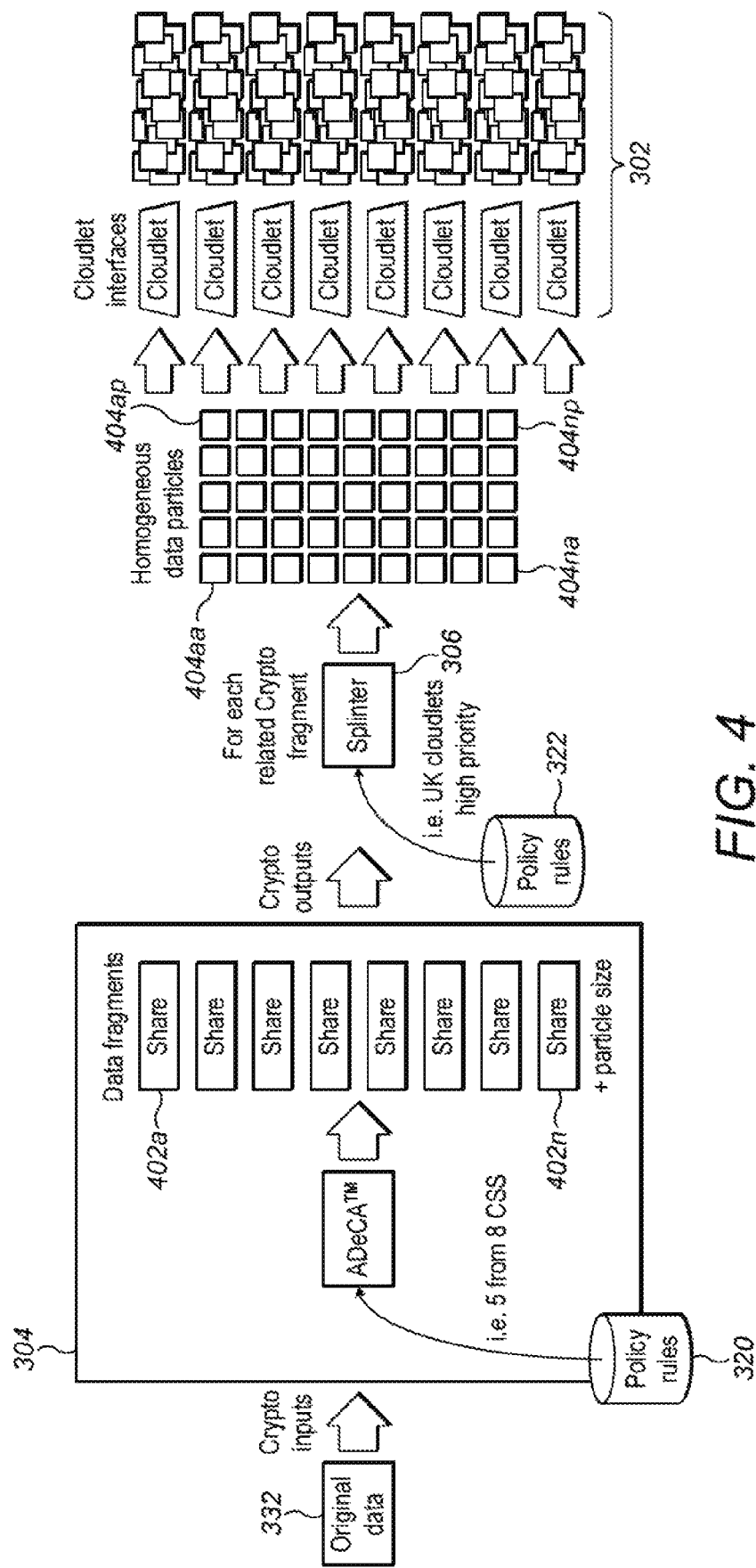
FIG. 4 illustrates operation of the system of FIG. 3.

FIG. 4 shows a more detailed implementation of the secret sharing module 304. It is a secure data storage system that provides a plurality of secret sharing algorithms for selection. The secret sharing module 304 is coupled to a plurality of storage means 302 and to a secret sharing policy engine 318 (not separately shown in FIG. 4) and policy rules database 320. The secret sharing policy engine 318 and the policy rules database 320 can provide an interface for the Data I/O Services 210 and the Configuration Services 228 of FIG. 2.

The secret sharing algorithms allow data 332 to be split into a plurality, N, of secret shares N 402a-402n according to a selected secret sharing algorithm, such that a threshold number of shares, T, is sufficient to recover the data, where T is less than N. Some examples of secret sharing algorithms include the Perfect Secret Sharing Scheme (PSS); Computation Secret Sharing (CSS); Information dispersal algorithm (IDA) and Reed-Solomon encoding with combined encryption. This list is not exhaustive, and any secret sharing scheme may be used alone or in combination. The selection of N and T is determined by the striping policy. The secret sharing policy engine 318 and the policy rules database 320 allow the administrator to set, and the user or administrator to select, preferences which in turn select which secret sharing algorithm is to be used for the particular user or particular data or other circumstances.

The secret sharing module 304 is able to identify a striping policy according to input preferences. The input preferences may be provided to the policy rules database 320 by users or administrators through configuration services 232 (FIG. 2).

The secret sharing policy engine 318 and the policy rules database 320 allow a user or administrator to select a relatively high T/N ratio or a relatively low T/N ratio. A relatively high T/N ratio creates a relatively high security but relatively low resilience secret sharing algorithm. A relatively low T/N creates a relatively low security but relatively high resilience secret sharing algorithm, the selection of T/N is translated into the selection of striping policy.

The secret sharing policy engine 318 and the policy rules database 320 optionally allow the user or administrator to select or configure an encryption method such as Advanced Encryption Standards (AES) or Blowfish™. The encryption method can be used on the data or the plurality of secret shares. The encryption method is stored in the secret sharing module 304.

The secret sharing module 304 uses preferences provided by the secret sharing policy engine 318 and the policy rules database 320 to split the data into a plurality of secret shares 402a-402n. Where no specific selection or preference of policy or rules is chosen for data, the secret sharing module, 304 will automatically apply a secret sharing and persistence method from a default set of one or more of a plurality of secret sharing algorithms and encryption, based on parameters such as data type, size, policy feedback from the persistence engine and other operating parameters related to the current efficiency of the architecture 314. This particular method provides a further application of a "zero knowledge" user approach to an SCSS (i.e. a system in which those who work on one part of the system have no knowledge of what is happening in another part)

The secret sharing module 304 generates metadata associated with the data 332 and the plurality of secret shares 402a-402n. In particular, the metadata comprises information according to the selected secret sharing algorithm and/or parameters that was/were used to create the plurality of secret shares 402a-402n. By "algorithm" is meant the method of splitting the data (e.g. file) into a plurality of secret shares (e.g. PSS, CSS, IDA, Reed-Solomon coding with encryption, etc.) and by "parameters" are meant at least the values N and T. The term "method" will be used generically to encompass different algorithms and different implementations of an algorithm with different parameters.

The metadata generated in the secret sharing module 304 attaches to the shares. Metadata stored in the middleware apps 313 and policy engine 318 may also include policy rules for access control purposes such as which shareholders are regarded as the owners of which shares and in what circumstances they are allowed to retrieve the shares. Additionally, the ADeCA™ engine generates an identifier and attaches the identifier to the plurality of secret shares.

The encryption method, the metadata and the identifier are collectively known as sticky policies.

The secret sharing module 304 writes the plurality of secret shares 402a-402n to the plurality of storage means 302. The plurality of storage means 302 are outside of the secure storage system of the secret sharing module 304. The plurality of storage 302 means may include a public cloud 258, a private could 260, a non-SQL data store 262 and a file server 264. The plurality of storage means may be referred to as the Multi-Cloud. The cloud storage means 302 may alternatively be referred to as the cloud service providers (CSPs).

It is preferred that each of the plurality of storage means is an independent storage means, each having a different address (e.g. URL or URI). They may also have a separate set of virtual machines that are managed to different interfaces. They may be independently addressable, may not have the same published endpoints, may be provided by different cloud service providers, may have different underlying technology and/or may be in a different geographic location.

In a preferred embodiment, the secret sharing module 304 writes a single secret share of the plurality of secret shares 402a-402n to a single storage means of the plurality of storage means 302. In an alternative embodiment, the ADeCA™ engine writes more than one but less than T secret shares of the plurality of secret shares 402a-402n to a single storage means of the plurality of storage means 302.

The secret sharing module 304 is synonymously referred to as the ADeCA™ data vault and may encompass the application platform 102, the main multi-cloud proxy server with router 104 and the meta-data module 106.

To retrieve the data after it has been stored, the secret sharing module 304 uses the identifier to retrieve the at least T shares of the plurality of secret shares 402a-402n from the plurality of storage means 302. Then the secret sharing module 304 uses the stored metadata to recreate the data from the retrieved secret shares.

Appendix 1 shows a detailed implementation of the secret sharing module using Java™.

Figure 5:
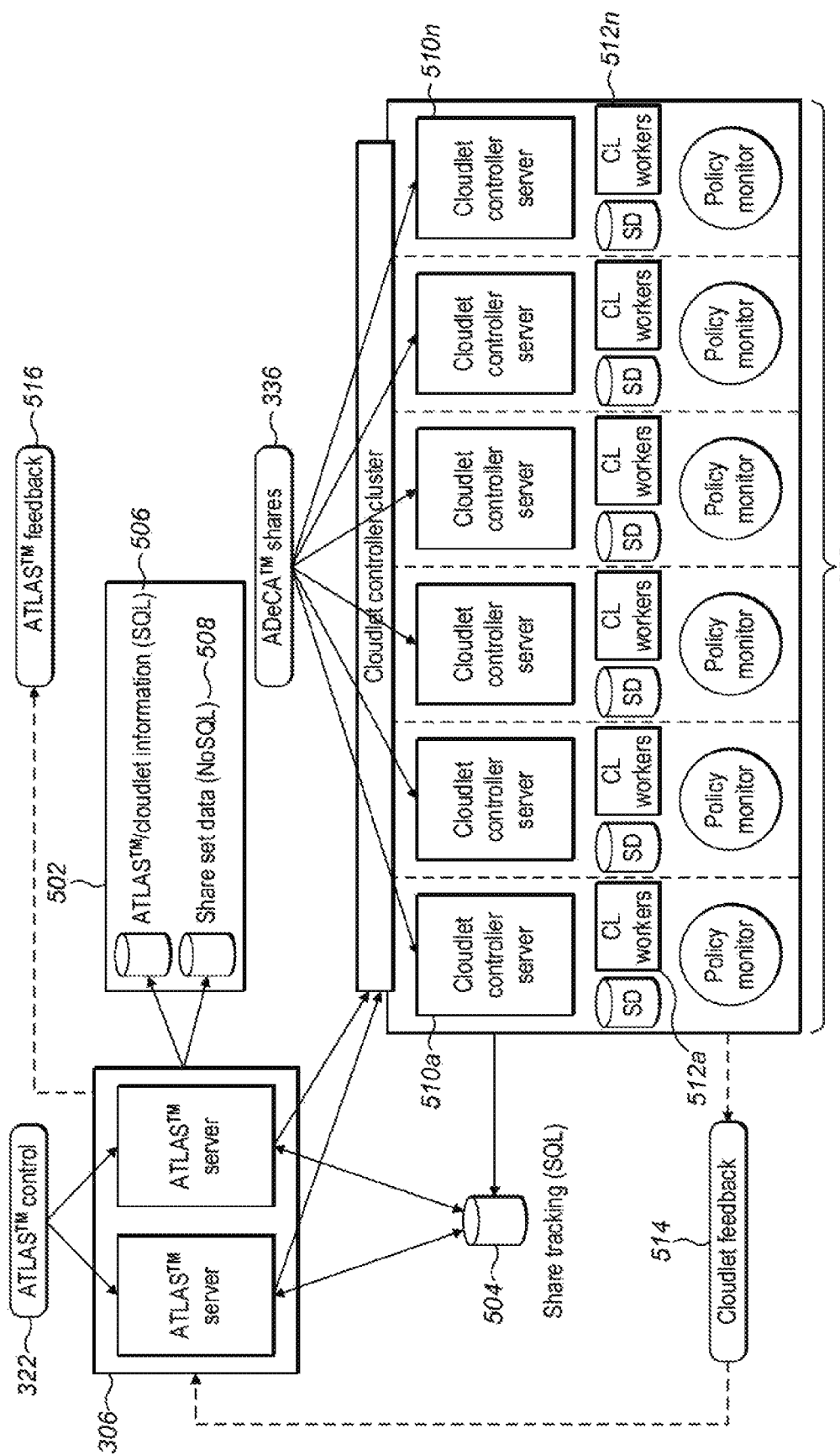
FIG. 5 further illustrates, in hardware and software elements, certain aspects of the system of FIG. 3.

Operation of the persistence engine 306 and the persistence policy engine 322 of FIG. 5 is now described.

Data 332 is fragmented into a plurality, N, of secret shares 402a-402n of equal size according to a secret sharing algorithm, wherein a threshold number, T, of such shares is sufficient to recover the data. T is less than N.

The persistence engine splits each of the plurality of secret shares 402a-402n into p data particles 404aa-404np. The data particles are preferably of equal size to ensure that each data particle is anonymous relative to each other. The size of the data particles 404aa-404np is determined by the administrator preferences. Alternatively, the size of the data particles is determined by computational limitations, such as available storage and bandwidth. In a further alternative embodiment, the size of the data particles is determined by a combination on input preferences and computational limitations.

The user or administrator preferences and computational limitations are identified by the persistence policy engine 322.

The persistence engine 306 adds an identifier to each of the data particles 404aa-404np. The identifier enables the persistence engine 306 to keep a track of where each of the data particles 404aa-404np is located. The identifier is stored in a secure storage system only accessible by the persistence engine 306. In a further embodiment, this secure storage system could be stored recursively by another SCSS.

The persistence engine 306 writes the data particles to a plurality of storage means 302. Preferably, all data particle 404xa-404xp of a share x are written to an independent storage means corresponding to that share, and data particles of different shares are written to different independent storage means. In this way, if an independent storage means is lost or a data particle within that independent storage means is lost, the result would mean a loss of one share at the most. In doing this, the persistence engine 306 ensures that data processed through the architecture 300 is not vulnerable to loss or compromise of any single CSP or independent storage means.

Each storage means is "independent" in that it is specific to a group of particles comprising a share.

Since the data particles 404aa-404np are anonymous relative to each other, a hacker entering the independent storage means 302 would not be able to identify one particle from another. Much less, the hacker would not be able to determine which data particles within the store have sensitive information, or which form a set 404xa-404xp that may together have sensitive information.

The independent storage means may pre-store particles of dummy data whereby the data particles 404xa-404xp in a store co-exist with particles of dummy data. By so doing, the data particles are further obfuscated in the independent storage means 302.

The persistence engine 306 may perform a clean-up process for each of the plurality of storage means 302. The data particles are given a set timer and once the timer has finished the data particles are expired. The expired data particles then become particles of dummy data and co-exist with the data particles 404a-404n. This obfuscates the data particles 404a-404n without the need to generate further particles of dummy data.

The persistence policy engine 322 may identify a persistence policy in accordance with input preferences. A set of the plurality of storage means is then selected in accordance with the persistence policy.

In an embodiment, the persistence policy is identified in accordance with the sensitivity of data. This ensures that highly sensitive data is stored in the most secure storage means.

The persistence policies are defined by user or administrator preferences. For example, the user or administrator preferences may include a set of storage means that are not to be used. Alternatively, the user or administrator preference may include a set of storage means that are preferred. The user or administrator preferences may be based on attributes relating to the plurality of storage means 302. The attributes may include identifiers of storage providers and geographical locations.

The persistence policy may include a latency preference. The persistence policy may also include duplication of the plurality of shares across the plurality of storage means.

The performance of the plurality of storage means 302 is monitored according to the persistence policies. The set of storage means 302 used to store data particles 404aa-404np is then adjusted based on the performance of the plurality of storage means 302.

The selection of persistence policy includes a measure of the trustworthiness of the plurality of storage means 302.

FIG. 5 shows a more detailed implementation of the persistence engine 306. It comprises the persistence engine 306, the persistence policy engine 322 (this is also referred to as persistence control), the plurality of storage means 302, and persistence storage means information databases 502. The latter comprises a persistence information database related to shares, cloudlet locations and policy rules 506 and a share set data database 508. A share tracking database 504 is provided that has information for tracking shares across a plurality of different storage architectures.

In operation, the persistence engine 306 receives a plurality of secret shares 402a-402n and splits them into data particles 404aa-404np that are anonymous relative to each other. The persistence engine 306 also receives the user or administrator preferences and computational limitations from the persistence policy engine 322. The persistence policy engine 306 then adds an identifier to each of the data particles 404aa-404np. The identifier enables the persistence engine 306 to keep a track of where each of the data particles 404aa-404np is located. The identifier is stored in the persistence storage means information database 502. The persistence engine 306 then stores the data particles 404aa-404np in the plurality of storage means 302.

The plurality of storage means 302 is determined by the user or administrator's preferences. In an embodiment, the identifier is stored with the corresponding data particle.

Figure 6:
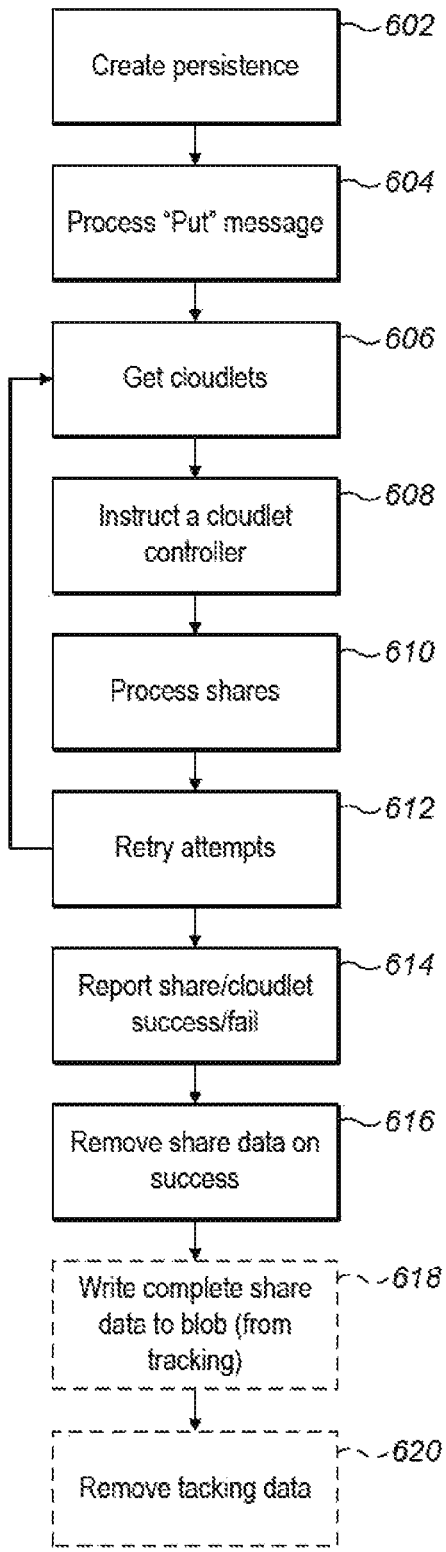
FIG. 6 is a process flow diagram illustrating operation of the system of FIG. 5.

FIG. 6 is a process flow diagram showing operation of the persistence engine 306 of FIG. 5.

At step 602, the persistence engine 306 creates a persistence ID. The persistence ID includes information provided by the persistence policy engine 322, such as the user or administrator preferences. At step 604, the persistence engine 306 receives a "put" message, which tells the persistence engine to store data in to the plurality of storage means 302. At step 606, the persistence engine 306 retrieves information from database 506 on the plurality of storage means 302 to be used. This allows suitable cloudlets to be selected and thus ensures that the data to be stored in the storage means 302 is stored correctly, in accordance with preferred policy.

At step 608, the persistence engine 306 sends a cloudlet controller 510a-510n information on how to store the secret shares 336. At step 610, the secret shares 336 are sent to the cloudlets 302. The cloudlet controllers 510a-510n write the shares to the plurality of storage means 302 according to information provided at step 608.

If necessary, at step 612, the cloudlet controllers 510a-510n retry storing any secret shares 336 that failed to store at a first attempt. This involves returning to step 606, whereupon the persistence engine 306 re-tries to write the secret shares 402a-402n to the same storage means 302 or the persistence engine 306 may attempt to write the secret shares 402a-402n to an alternative storage means 302. A retry attempt can be at the particle level if storage of only certain particles failed. This process is repeated until all the data particles 404aa-404np are written to the data storage means 302.

At step 614, the cloudlet controllers 510a-510n send feedback messages 514 to the persistence engine 306. Each storage means 302 sends a success message if the shares 336 were written to the storage means 302 and sends a fail message if the shares 336 were not written to the storage means 302.

At step 616, the shares 336 are deleted in the persistence engine 306.

Steps 618 and 620 are optional steps that relate to logging module 308 (of FIG. 3). In step 618, data relating to the complete share is written to blob from tracking. In step 620 tracking data for the share is removed.

Figure 7:
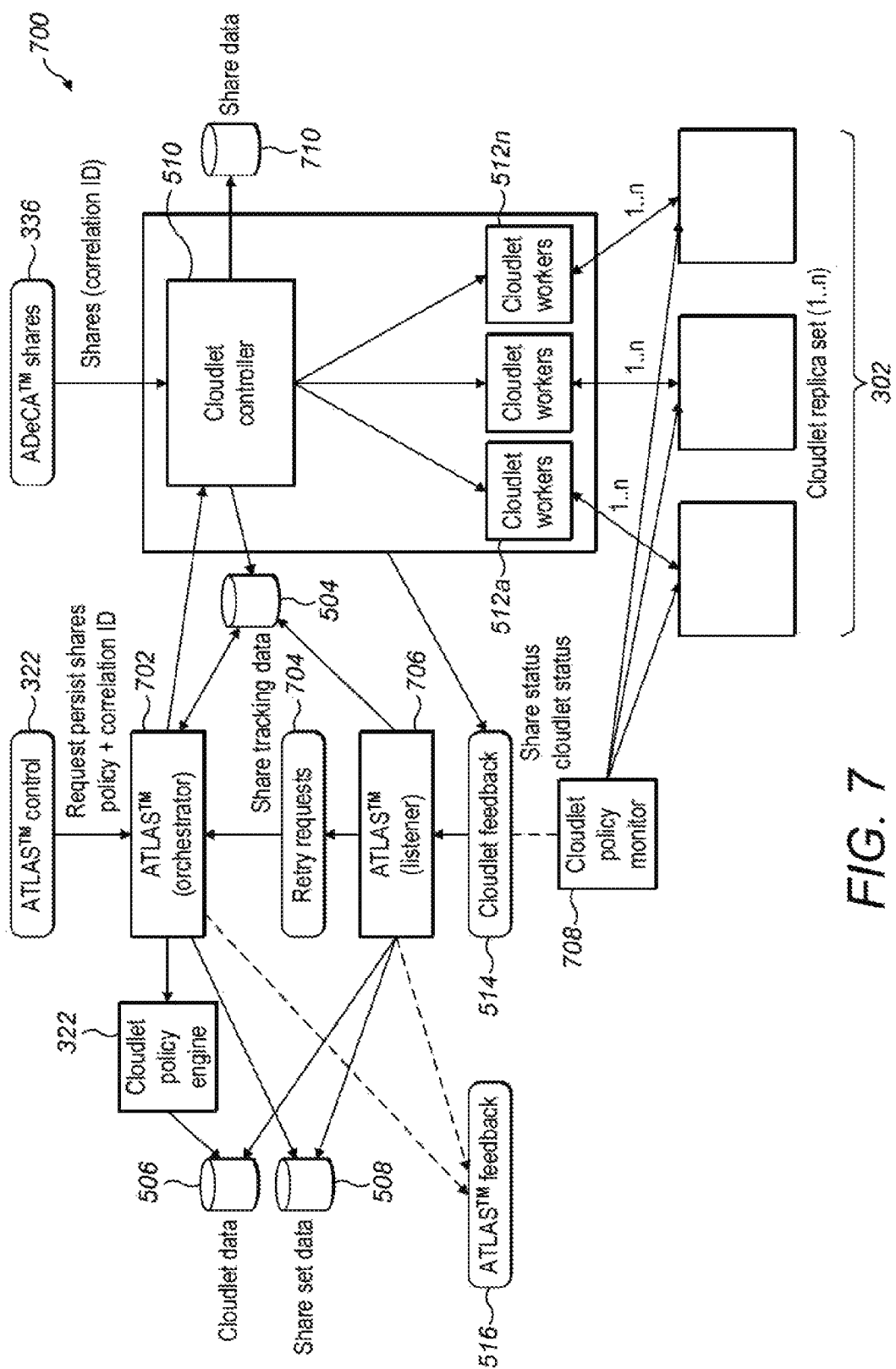
FIG. 7 further illustrates, in hardware and software elements, certain aspects of the system of FIG. 3.

FIG. 7 shows a detailed implementation of the persistence engine 700 that allows the cloudlets and storage means 302 to feedback performance level to the persistence engine.

The system shows persistence orchestrator 702 coupled to persistence policy engine 322. The persistence orchestrator is further connected to the cloudlet controller 510, a retry requests module 704, the share set data database 508, the share tracking data database 504 and optionally a feedback module 516. The system further comprises a persistence listener 706, which is coupled to the retry requests module 704, the cloudlet data database 506 and the share set database 508, the share tracking data database 504 and the cloudlet feedback module 514.

The cloudlet controller 510 is connected to cloudlet workers 512a-n, the secret shares module 336 and a share data database 710. The cloudlet workers are connected to the storage means 302. A cloudlet policy monitor 708 connects the storage means 302 with the cloudlet feedback module 514. Cloudlet workers and cloudlets are asynchronous. One cloudlet worker is spawned per share to store that share and, during retrieve, a cloudlet worker retrieves one share per cloudlet. The cloudlet controller 510 operates on a set of shares. It waits for T shares for a particular identifier to arrive back from the cloudlet workers.

The shared secret policy engine 242 (FIG. 2)/318 (FIG. 3) and the persistence policy engine 322 have interdependent common attributes. This may be extended to include the shared secret policy engine 318 and shared secret policy rules 320, and persistence policy engine 322, indicating the interdependency of administrator and end user policy interaction. I.e. administrator policies and end user policies can be implemented in either the shared secret policy engine 318/shared secret policy rules 320, or the persistence policy engine 322 or both and these may be interdependent.

For example, a user/administrator may seek to achieve a certain level in a 3-dimensional space of (a) resilience, (b) security and (c) performance (each on a scale of minimum to maximum or 1 to 10 or 0 to 100). Such a level is converted into a policy for the shared secret policy engine 318/shared secret policy rules 320 and a policy for the persistence policy engine 322, but if the latter (for example) is unable to achieve the desired level of performance, this may lead to adjustment of the persistence policy or may lead to adjustment of the shared secret policy engine (e.g. if performance takes priority in the overall policy) and lead to compromise in one of the other dimensions (resilience and security). Alternatively, if one of the other dimensions (e.g. security) takes priority, this may lead to compromise in performance in the shared secret engine and/or the persistence engine.

Note that a policy may include obligations (mandatory requirements) and preferences. A preference at a maximum level (10 or 100) may be construed as "mandatory" while a lower preference is non-mandatory.

For example, a healthcare application may require high security and medium performance, but may involve file sizes of 100 s of Mbytes. It may typically be possible to handle such a large file in the shared secret module to the satisfaction of the shared secret policy, but when passed to the persistence module, the large file size may create performance issues for the persistence engine at that level of security and, in such a case, the persistence policy engine may instruct the shared secret policy engine to adjust its policy and (for example) increase the number N. Alternatively, the persistence policy engine may seek to store the data on a certain type of storage in order to achieve a certain level of security but may have to modify that policy because the preferred storage will not meet the performance goals (or compromise on performance in order to meet the security goals.

Thus, policies may include prioritization of security versus resilience versus performance in a three-dimensional model.

The shared secret (ADeCA™) engine and the persistence engine (ATLA™) can be used together to boost the security of data. In an embodiment, the ADeCA engine uses a secret sharing scheme that allows the data to be split into a maximum of 50 shares. If the data is very sensitive then the policy will then fragment each of the 50 shares into up to 250 anonymous and equal data particles before storing the data particles into up to 20 independent storage means with relatively high security. The benefit of this embodiment is that the data is secure. In an alternative scenario, the data is deemed to be not very sensitive but must be able to be retrieved quickly. In this case, the shared secret engine may split the data into 20 shares and the persistence engine may fragment the 20 shares into 100 fragments and then store the fragments in 20 independent storage means with relatively low security.

Certain policies can be implemented only by the persistence engine (e.g. geographical, ownership or other restrictions on which cloudlets may be selected for a particular application/usage case). Meeting such policies by the persistence engine may require adjustment of other policies by the persistence policy engine and/or the shared secret policy engine to achieve other aspects of resilience/performance.

Secret sharing schemes have been proposed for data splitting and reconstruction, thereby providing data security in a keyless manner. This section outlines three of the main contenders for secret sharing schemes in cloud-based systems. They are Adi Shamir's Perfect Secret Sharing Scheme (PSS), Hugo Krawczyk's Secret Sharing made short or Computational Secret Sharing scheme (CSS) and Rabin's Information Dispersal Algorithm (IDA). The performance overhead of the three secret sharing schemes, at increasing thresholds and increasing data sizes shows varied behaviours. The varied behaviours depict the secret sharing schemes strengths and weaknesses at different application scenarios.

It is useful to know the implication variance in data size has on the performance of each secret sharing scheme (SSS) algorithm in terms of share creation and share recreation in case one wants to apply any in cloud-based designs.

Data sizes from 1024 KB to 16,384 KB were evaluated. The data generated are arbitrary due to the fact that the evaluations are not catered for in relation to one specific area where SSS algorithms may be applied in. The test machine is a D-Series 3 specification Microsoft Azure™ virtual machine which consists of 4 vCores, 14 GB of RAM and a 200 GB SSD.

Two primary sets of results were presented which use the parameters of N=5; T=2 and N=10; T=4. The variable N relates to the number of shares to create while the variable T relates to the number of shares required for recreation of the original arbitrary data (using each SSS algorithm). It is found that IDA is the fastest algorithm regardless of data size. CSS comes second in terms of time taken for share creation and recreation, while PSS comes last. One significant observation in the results is that PSS demonstrates greater issues in regards to scalability as the data size increases in comparison with the other two algorithms. Additionally, as we increase the parameters from N=5; T=2 to N=10; T=4, it can be demonstrated that only share creation will produce significant increase in performance time.

Although IDA has demonstrated the fastest time in test results, in this context it would be naive to simply use this algorithm from these results alone. Depending on the context and application, there may be a need to strike a balance between ensuring strong security and acceptable level of performance. Thus, ultimately, the decision on which SSS algorithm to use will be most dependent on the use-case scenario at hand.

APPENDIX 1

The Anonymised, Distributed, encryption Cloud Architecture (ADeCA™) Engine is designed to be a high-performance and high-throughput software component, which is massively scalable and able to process large volume of transactions in real-time. It splits sensitive business data into multiple secret shares according to predefined policies to meet both security and reliability requirements presented by a business critical application.

Figure 8:
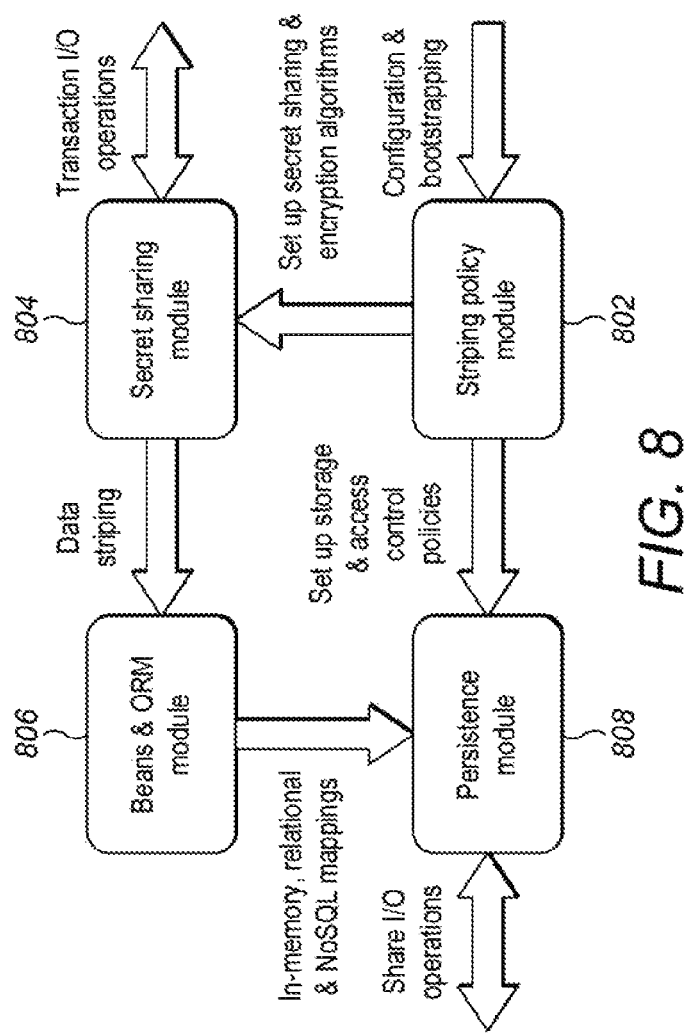
FIG. 8 illustrates certain elements of an embodiment described in an appendix.

At a high level, the ADeCA™ Engine adopts an extensible design and may consist of four modules, as shown in FIG. 8.

The striping policy module 802 supports the definition and validation of Data Striping Policies that configure the behaviours of the Secret Sharing module 804. Each of the existing secret sharing algorithms, including RS, IDA, PSS, CSS and PVSS, presents a set of distinct characteristics in terms of security, computational complexity, and storage overheads. Hence, it would be necessary to apply different secret sharing algorithms to different kinds of data objects, so as to strike a balance between performance and security goals within a specific application scenario. For example, IDA may be adopted to process large volume of transient data objects, and CSS may be adopted to process fewer yet more significant and sensitive data objects. The Data Striping Policy is introduced to facilitate such flexible setups.

In addition, a Data Striping Policy may carry further directions about how a secret share should be stored in an underlying data platform and accessed later on by its shareholders. In other words, a Data Striping Policy may also serve as a Persistence Policy as well as an Access Control Policy if needed by a specific application. Such policies shall be understood and enforced by A Persistence module 808.

A secret sharing module 804 fulfils a Data Striping Policy and converts an original data object into a number of secret shares. It is also able to reconstruct the original data object when a sufficient number of secret shares are combined together.

Key information required by the Secret Sharing module 804 include:
  N—The total number of secret shares to create from an original data object.
  T—The threshold, i.e. the minimum number of secret shares that are needed to reconstruct the original data object.
  Algorithm—The secret sharing algorithm used to create the shares, including IDA, PSS, CSS and PVSS. It may require further configuration parameters depending on the actual type of algorithm selected, e.g. the random source, the key length, and the symmetric encryption algorithm associated.

The Secret Sharing module 804 receives such key information from the Striping Policy module 802 when the system starts up.

A "beans and ORM" module 806 wraps up raw secret shares (in the form of byte arrays) with their metadata into serializable Java Beans. On the one hand, the metadata provides necessary information for the Engine to reconstruct the original data objects at a later time using correct algorithms and a sufficient number of shares. On the other hand, the metadata may also carry policy rules for access control purposes, e.g. which shareholders are regarded as the owners of which shares, and in what circumstances they are allowed to retrieve the shares. Because such metadata is attached to secret shares, always being distributed, stored and interpreted together with the shares, it is often referred to as Sticky Policies.

In practice, Stick Policy contents can be embedded within a Data Striping Policy (as described above). When the Secret Sharing module 804 processes a Data Striping Policy, it is able to identify and extract Sticky Policies within, split the original data object into multiple secret shares as requested, wrap up raw shares into data beans using the Beans & ORM module 806, and then inject Sticky Policies back into the corresponding data beans.

Furthermore, the other important function of the Beans & ORM module 806 is to perform Object-Relational Mappings (ORM), as its name suggests. Object data models and relational data models do not work very well together due to the "object-relational impedance mismatch" (a.k.a. the "paradigm mismatch"). Specifically, relational models represent data in a tabular format, whereas object-oriented programming languages represent data as interconnected graphs of objects. Hence, an ORM tool is needed to encapsulate common functionalities for bridging the gap between the two models to ensure that data objects can be persisted by a relational database and relational tables can also be restored into data objects in memory. Ideally, such two-way conversions can be carried out transparently, and without introducing considerable performance overheads. The Beans & ORM module 806 is able to meet such requirements.

If the Secret Sharing module 804 serves as a source for secret shares, the Persistence module 808 serves as a sink. Once raw secret shares have been properly wrapped up into data beans with sticky policies, they can be moved out from memory to an external storage platform, made available to shareholders. The Persistence module 808 handles that by supporting a range of storage platforms:
  In-Memory Storage—For testing and evaluation purposes, the Persistence module 808 provides a simple in-memory storage solution using a ConcurrentHashMap. In this case, data beans are buffered in memory and can be retrieved to reconstruct the original object immediately. Key advantage of using in-memory storage is simplicity for carrying out functional tests, as well as preliminary system performance and throughput evaluations which do not need to consider realistic environmental factors like end-to-end network latencies and so on.
  Relational Databases—This is the most conventional storage solution used by large numbers of software systems. The Persistence module 808 may support existing RDBMS through JDO, JPA and Hibernate frameworks.
  NoSQL Databases—In theoretical computer science, the CAP theorem (a.k.a. Brewer's theorem) states that it is impossible for a distributed computer system to simultaneously guarantee Consistency, Availability and Partition-tolerance (i.e. all three of C, A and P). While conventional database systems prioritize C and P so as to ensure Atomicity, Consistency, Isolation and Durability (ACID) properties of transactions, recent NoSQL database systems tend to prioritize A and P so as to offer better scalability, robustness, performance and throughput with mitigated consistency. The Engine recommends using NoSQL database systems as the default persistence solution over conventional RDBMS. Initially, the Persistence module 808 plans to provide support for Azure™ Table Storage service.

Basic usage of the Engine with straightforward example source codes is now described. Currently, the Engine is implemented on top of the Java platform, and thus the examples are also written in Java (requires JRE 7 or above).

The basic example application and code snippet below shows a Java bean called SimpleSecret:

```
public class SimpleSecret {
    private String data;
    private String metadata;
    public SimpleSecret( ) { }
    public SimpleSecret(String data, String metadata) {
        this.data = data;
        this.metadata = metadata;
    }
    public String getData( ) {
        return data;
    }
    public void setData(String data) {
        this.data = data;
    }
    public String getMetadata( ) {
        return metadata;
    }
    public void setMetadata(String metadata) {
        this.metadata = metadata;
    }
}
```

This Java bean comprises of two String fields, two constructors, and a few getter and setter methods. To split a SimpleSecret object into multiple shares using the Engine, we only need to make two changes:

Make the Java bean serializable;
Put @Stripe annotation in front of the class definition.
The updated SimpleSecret class shall look like below:

```
import java.io.Serializable;
import payfont.core.data.anno.Stripe;
@Stripe
public class SimpleSecret implements Serializable {

//The same fields, constructors, getters and setters as before
    ... ...
}
```

Below shows code to create a SimpleSecret object and split it into shares:

```
SimpleSecret ss = new SimpleSecret("Wulala", "A terrible curse");
EngineFactory ef = new CachedEngineFactory( );
Engine<SimpleSecret> e = ef.getEngine(SimpleSecret.class);
Map<String, List<String>> results = e.createShares(ss);
```

```
ArrayList<PayfontShare<SimpleSecret>> shares = new ArrayList<PayfontShare<SimpleSecret>>( );
for(String id : results.keySet( ))
    shares.add(e.getShare(id, null, null));
for(PayfontShare<SimpleSecret> s : shares)
    System.out.println(s.toString(false));
```

Notes:

1. Above all, we need to create an EngineFactory instance, which helps create the actual Engine object that we will use to generate secret shares. There are potentially many kinds of EngineFactories, and the one used in the example above was a Cached Engine Factory.

2. The Engine is a generic class that has to be parameterised over types. In this example, we created an Engine object that is dedicated to the SimpleSecret type. If we needed to process multiple types, we would create multiple Engine objects using the EngineFactory for each type. The primary reason behind this design is because in practice it is likely that different data striping policies need to be applied to different data types (as discussed in Section 1.1). The interpretation of complex data striping policies can be quite time-consuming, and thus it should not be performed repeatedly. A parameterised Engine object is initialised over a specific data type, which is associated with a unique data striping policy. Furthermore, the CachedEngineFactory keeps track of all the Engine objects that have been created, and thus indirectly guarantees that no data striping policy would ever be interpreted twice. Hence, parameterised Engine objects are syntactically safer and computationally more efficient to use.

3. The Engine provides a createShares( )method, which splits a data object into multiple secret shares according to the data striping policy, and then returns a Map object. The keys of the Map are unique identifiers of each secret share generated, and the corresponding values are "locators" telling where the shares are persisted. A locator is of type List<String>, because a share may have replicas stored at multiple locations so as to enhance its reliability and availability (as required by the data striping policy).

4. The Beans & ORM module 806 wraps raw shares into PayfontShare objects (as discussed in Section 1.3), which is again a parameterised generic class. Since both the Engine and the PayfontShare objects are parameterised, splitting and reconstructing operations are always type safe, i.e. it is syntactically impossible to feed an Engine with unexpected or inconsistent types of PayfontShare by mistake.

5. The Engine provides a getShare( )method, which helps retrieve a share given a unique identifier, a locator, and a security token for authorisation purposes. When an in-memory data store is used, the locator and the security token can be omitted, so null values were used in place.

6. Finally, we printed out brief summaries of all the secret shares created by the Engine—toString(false) suggests a shorter representation, otherwise verbose share contents would be included. The application's output should look like below:

```
----------------------------------------
CSS share (T=3)
Id: ae2e2953-606f-4080-b2b7-4d30c18d596a
Size: 96 byte
----------------------------------------
CSS share (T=3)
Id: 061f17b4-d568-45f6-ad3c-ddb0b087325d
Size: 96 byte
----------------------------------------
CSS share (T=3)
Id: de3b945c-56e6-43e0-bb34-7805b8c26687
Size: 96 byte
----------------------------------------
CSS share (T=3)
Id: d25e3750-d428-45f1-9360-7d84252cfc3c
Size: 96 byte
----------------------------------------
CSS share (T=3)
Id: 0e966e34-9414-417d-9d45-d9c289990a54
Size: 96 byte
----------------------------------------
```

Refining the Data Striping Policy

From the output of the previous example we can see that the SimpleSecret object was split into five shares, and at least three shares were required to reconstruct the original data (i.e. T=3). Also, the CSS algorithm and the in-memory data store were adopted by default.

In fact, such default behaviours are not defined by the Engine, as the Engine only takes orders from the Striping Policy module 802. Instead, they are defined by the default data striping policy, which is supplied by the @Stripe annotation.

The @Stripe annotation is the most convenient way for programmers to define flexible data striping policies and attach them to different data types. It consists of the following configuration properties:

N—The total number of secret shares to create from an original data object (5 by default);
T—The threshold, i.e. the minimum number of secret shares that are needed to reconstruct the original data object (3 by default);
Method—The secret sharing algorithm used to create the shares, including CSS, IDS, and PSS (CSS by default);
Crypto—The symmetric encryption algorithm used by the secret sharing algorithm, including ChaCha20, AES, and AESGCM (ChaCha20 by default);
RNG—The random generator used by the secret sharing algorithm, including SHA1, BCD, CTR, and STR (SHA1 by default);
PH—The persistence handler used to store the secret shares, including InMemory, Relational, and AzureTable (InMemory by default);
PolicyURI—A string URI for an external data striping policy file that overrides the configurations provided by the @Stripe annotation.

Values of these properties can be set up as below:

```
import java.io.Serializable;
import payfont.core.data.anno.Stripe;
import  payfont.core.data.anno.StripingAlgorithm;
@Stripe(N=7, T=4, Method = StripingAlgorithm.PSS)
```

```
public class SimpleSecret implements Serializable{
    //The same fields, constructors, getters and setters as before
    ... ...
}
```

With the updated data striping policy, the application's output becomes:

```
----------------------------------------
PSS share (T=4)
Id: 92abb33b-4b2d-46ac-9b26-5a11ede152cb
Size: 137 byte
----------------------------------------
PSS share (T=4)
Id: aef90e13-7668-4613-a6c5-c3897f2abe04
Size: 137 byte
----------------------------------------
PSS share (T=4)
Id: 758baeff-03e6-44b8-998a-e03a7f82e789
Size: 137 byte
----------------------------------------
PSS share (T=4)
Id: 044954c4-f495-486d-9bd1-042ea8f38f1d
Size: 137 byte
----------------------------------------
PSS share (T=4)
Id: 8dffd9f0-ed05-485c-8c77-5a53333cc4eb
Size: 137 byte
----------------------------------------
PSS share (T=4)
Id: f6ec2db2-6d25-4dbc-91ba-f6b84015bac6
Size: 137 byte
----------------------------------------
PSS share (T=4)
Id: 469f23bc-a5a3-453d-8d40-a785a3f6b990
Size: 137 byte
----------------------------------------
```

Override the Striping Policy Using an External XML File

Alternatively, a data striping policy can be defined in an external XML file, of which the location is specified by the PolicyURI property of the @Stripe annotation. In this case, the Striping Policy module 802 would prioritise the file and override any existing configurations in the @Stripe annotation.

Reconstructing the Original Data Object

Continuing with the example source codes above, we can use the following codes to reconstruct the original data object from a random selection of shares:

```
Random rand = new Random( );
int to_discard = shares.size( ) – shares.get(0).getThreshold( );
for(int i=0; i<to_discard; i++)
    shares.remove(rand.nextInt(shares.size( )));
SimpleSecret original = e.reconstructSecret(shares);
System.out.println("The original secret is: " + original.getData( ) +
" – " +
    original.getMetadata( ));
```

The application output shall look like:
The original secret is: Wulala—A terrible curse
Data Striping Policy Schema
The below code provides an example of a complete XML schema of the file, i.e. StripingPolicySchema.xsd

```
<?xml version="1.0" encoding="UTF-8"?>
<schema xmlns= "http://www.w3.org/2001/XMLSchema"
            targetNamespace="http://www.napier.ac.uk/StripingPolicySche
            ma"
```

-continued

```
                    xmlns:tns="http://www.napier.ac.uk/StripingPolicySchema"
                    elementFormDefault="qualified">
    <element name="stripes" type="tns:stripes"></element>
    <complexType name="stripes">
        <sequenc
           e>
            <element name="n" type="int" maxOccurs="1" minOccurs="1"></element>
            <element name="t" type="int" maxOccurs="1" minOccurs="1"></element>
            <element name="algorithm" type="tns:algorithm"
                        maxOccurs="1" minOccurs="1"></element>
            <element name="persistence" maxOccurs="1" minOccurs="1">
                <simpleType>
                    <restriction base="string">
                        <enumeration value="InMemory" />
                        <enumeration value="Relational" />
                        <enumeration value="Cassandra" />
                    </restriction></simpleType></element>
            <element name="authorisation" type="tns:authorisation"></element>
            <element name="endpoints" type="tns:endpoints"></element>
</sequence></
complexType>
    <complexType name="algorithm">
        <sequenc
           e>
            <element name="name">
            <simpleType>
                <restriction base="string">
                    <enumeration value="IDS" />
                    <enumeration value="PSS" />
                    <enumeration value="CSS" />
                </restriction></simpleType></element>
            <element name="rnd">
                <simpleType>
                    <restriction base="string">
                        <enumeration value="BCD" />
                        <enumeration value="SHA1" />
                        <enumeration value="CTR" />
                        <enumeration value="STR" />
                    </restriction>
                </simpleType>
            </element>
            <element name="crypto">
                <simpleType>
                    <restriction base="string">
                        <enumeration value="AES" />
                        <enumeration value="AESGCM" />
                        <enumeration value="ChaCha20" />
                    </restriction>
                </simpleType>
            </element>
        </sequence>
    </complexType>
    <complexType name="authorisation">
        <sequence>
            <element name="xacml" type="tns:xacml" maxOccurs="unbounded"
                            minOccurs="0"></element>
        </sequence>
    </complexType>
    <complexType name="xacml">
        <sequence>
            <element name="value" type="string" maxOccurs="1" minOccurs="1">
            </element>
        </sequence>
        <attribute name="style" type="string" default="URI" />
    </complexType>
    <complexType name="endpoints">
        <sequence>
            <element name="endpoint" type="string" maxOccurs="unbounded"
                            minOccurs="0"></element>
            <element name="scheduler">
                <simpleType>
                    <restriction base="string">
                        <enumeration value="Rotate" />
                        <enumeration value="Mirror" />
                    </restriction>
                </simpleType>
            </element>
```

```
        </sequence>
    </complexType>
</schema>
```

Data Striping Policy Example

The below code provides a sample policy file that conforms to this schema.

```
<?xml version="1.0" encoding="UTF-8"?>
<tns:stripes xmlns:tns="http://www.napier.ac.uk/StripingPolicySchema"
                    xmlns:xsi="http://www.w3.org/2001/XMLSchema-instance"
                    xsi:schemaLocation="http://www.napier.ac.uk/StripingPolicySchema
                                    StripingPolicySchema.xsd ">
    <tns:n>5</tns:n>
    <tns:t>3</tns:t>
    <tns:algorithm>
        <tns:name>CSS</tns:name>
        <tns:rnd>SHA1</tns:rnd>
        <tns:crypto>ChaCha20</tns:crypto>
    </tns:algorithm>
    <tns:persistence>InMemory</tns:persistence>
    <tns:authorisation>
        <tns:xacml style="URI">
            <tns:value>share_1.xacml</tns:value>
        </tns:xacml>
        <tns:xacml style="URI">
            <tns:value>share_2.xacml</tns:value>
        </tns:xacml>
        <tns:xacml style="TEXT">
            <tns:value><![CDATA[
                <Policy xmlns="urn:oasis:names:tc:xacml:3.0:core:schema:wd-17"
                                    PolicyId="SamplePolicy"
                                    RuleCombiningAlgId="urn:oasis:names:tc:xacml:1.0:
                                        rule-combining-algorithm:first-applicable" Version="1.0">
                    <Description>This is a sample XACML policy for share_3</Description>
                    <Target>
                        <AnyOf>
                            <AllOf>
                                <Match MatchId="urn:oasis:names:tc:xacml:1.0:
                                            function:string-regexp-match">
                                    <AttributeValue DataType="http://www.w3.org/2001/
                                        XMLSchema#string">share_3</AttributeValue>
                                    <AttributeDesignator AttributeId="urn:oasis:names:tc:
                                        xacml:1.0:resource:resource-id"
                                        Category="urn:oasis:names:tc:xacml:3.0:attribute
                                        -category:resource"
                                        DataType="http://www.w3.org/2001/XMLSchema#string"
                                        MustBePresent="true" />
                                </Match>
                            </AllOf>
                        </AnyOf>
                    </Target>
                    <Rule Effect="Permit" RuleId="Permit-Rule">
                        <Condition>
                            <Apply FunctionId="urn:oasis:names:tc:xacml:1.0:function:and">
                                <Apply FunctionId="urn:oasis:names:tc:xacml:1.0:function:
                                            string-at-least-one-member-of">
                                    <Apply FunctionId="urn:oasis:names:tc:xacml:1.0:function:
                                            string-bag">
                                        <AttributeValue DataType="http://www.w3.org/2001/XMLSchema
                                            #string">read</AttributeValue>
                                        <AttributeValue DataType="http://www.w3.org/2001/XMLSchema
                                            #string">write</AttributeValue>
                                        <AttributeValue DataType="http://www.w3.org/2001/XMLSchema
                                            #string">delete</AttributeValue>
                                    </Apply>
                                    <AttributeDesignator AttributeId="urn:oasis:names:tc:xacml:
                                            1.0:action:action-id" Category="urn:oasis:names:tc:xacml:
                                            3.0:attribute-category:action" DataType="http://www.w3.org/
                                            2001/XMLSchema#string" MustBePresent="true" />
                                </Apply>
                                <Apply FunctionId="urn:oasis:names:tc:xacml:1.0:function:
                                            any-of">
                                    <Function FunctionId="urn:oasis:names:tc:xacml:1.0:
                                            function:string-equal" />
                                    <AttributeValue DataType="http://www.w3.org/2001/XMLSchema
```

```
                    #string">admin</AttributeValue>
                  <AttributeDesignator AttributeId="http://claims/role"
                    Category="urn:oasis:names:tc:xacml:1.0:
                    subject-category:access-subject"
                    DataType="http://www.w3.org/2001/XMLSchema#string"
                    MustBePresent="true" />
                </Apply>
              </Apply>
            </Condition>
          </Rule>
          <Rule Effect="Deny" RuleId="Deny-Rule" />
        </Policy>]]>
      </tns:value>
    </tns:xacml>
  </tns:authorisation>
  <tns:endpoints>
    <tns:endpoint>data.windowsazure.com/payfont</tns:endpoint>
    <tns:endpoint>data.amazon.com/payfont</tns:endpoint>
    <tns:endpoint>data.google.com/payfont</tns:endpoint>
    <tns:scheduler>Rotate</tns:scheduler>
  </tns:endpoints>
</tns:stripes>
```

The invention claimed is:

1. A method of securely storing data in a cloud-based data vault, the method of securely storing data comprising:
   fragmenting the data with a secret sharing module into a plurality, N, of secret shares of equal size according to a secret sharing algorithm, wherein a threshold number, T, of such shares is sufficient to recover the data, where T is less than N;
   splitting with a persistence engine each share into data particles of equal size; and
   writing with the persistence engine the data particles to storage that comprises a plurality of independent stores such that, for each share, the data particles of that share are written to an independent store corresponding to that share, the independent store including co-existing particles of data from other shares of other data, all data particles of a share being written to the same independent store and particles from different shares being written to different independent stores, each data particle having an equal size and thus being anonymous relative to other data particles and identified only by an identifier unique within its respective store, and otherwise indistinguishable from the co-existing particles of the other shares of the other data.

2. The method of claim 1 further comprising pre-storing particles of dummy data within each store, whereby the particles of data and particles of dummy data co-exist in the store.

3. The method of claim 1, further comprising performing a clean-up process for each store, whereby particles that exist in the store are identified as having expired, whereby particles of data and particles of expired data co-exist in the store.

4. The method of claim 1, further comprising identifying a persistence policy for storage of the data in accordance with input preferences, whereby a set of store is selected for storage of the data in accordance with the persistence policy.

5. The method of claim 1 further comprising identifying a persistence policy for storage of the data in accordance with a sensitivity attribute associated with the data.

6. The method of claim 4, wherein polices are defined for user selection that include restrictions on attributes of the store that are to be selected to make up the set of store.

7. The method of claim 4, wherein polices are defined for user selection that include different attributes for each of the store that are to be selected to make up the set of store.

8. The method of claim 7 wherein the attributes include identifiers of storage providers and geographical locations of the store.

9. The method of claim 4, wherein polices are defined for user selection that include user latency preference.

10. The method of claim 4, wherein polices are defined for user selection that include duplication of one or more shares across plural independent store.

11. The method of claim 4, wherein polices are defined for user selection that include trustworthiness of the store.

12. The method of claim 1 further comprising monitoring a performance of each store for improvement of selection of store according to persistence policy.

13. The method of claim 1 further comprising destroying all copies of original data after a user-specified time, without any user intervention.

14. A system of securely storing data in a cloud-based data vault, the system of securely storing data comprising:
   a secret sharing module executed on a processor configured to fragment the data into a plurality, N, of secret shares of equal size according to a secret sharing algorithm, wherein a threshold number, T, of such shares is sufficient to recover the data, where T is less than N;
   the secret sharing module executed on a processor being further configured to split each share into data particles of equal size; and
   a memory interface configured to write the data particles to storage that comprises a plurality of independent stores such that, for each share, the data particles of that share are written to an independent store corresponding to that share, the independent store including alongside co-existing particles of data from other shares of other data, all data particles of a share being written to the same independent store and particles from different shares being written to different independent stores, each data particle having an equal size and thus being anonymous relative to other data particles and identified only by an identifier unique within its respective store, and otherwise indistinguishable from the co-existing particles of the other shares of the other data.

15. The system of claim 14 wherein the system is configured to pre-store particles of dummy data within each store, whereby the particles of data and particles of dummy data co-exist in the store.

16. The system of claim 14, wherein the system is configured to perform a clean-up process for each store, whereby particles that exist in the store are identified as having expired, whereby particles of data and particles of expired data co-exist in the store.

17. The system of claim 14, wherein the system is configured to identify a persistence policy for storage of the data in accordance with input preferences, whereby a set of store is selected for storage of the data in accordance with the persistence policy.

18. The system of claim 14, wherein the system is configured to destroy all copies of original data after a user-specified time, without any user intervention.

19. A non-transitory computer program product comprising instructions that when executed on a processor perform a process of securely storing data in a cloud-based data vault, the instructions of the non-transitory computer program product comprising:
fragmenting the data into a plurality, N, of secret shares of equal size according to a secret sharing algorithm, wherein a threshold number, T, of such shares is sufficient to recover the data, where T is less than N;
splitting each share into data particles of equal size; and
writing the data particles to storage that comprises a plurality of independent stores such that, for each share, the data particles of that share are written to an independent store corresponding to that share, the independent store including co-existing particles of data from other shares of other data, all data particles of a share being written to the same independent store and particles from different shares being written to different independent stores, each data particle having an equal size and thus being anonymous relative to other data particles and identified only by an identifier unique within its respective store, and otherwise indistinguishable from the co-existing particles of the other shares of the other data.

20. The non-transitory computer program product of claim 19 further comprising pre-storing particles of dummy data within each store, whereby the particles of data and particles of dummy data co-exist in the store.

21. The non-transitory computer program product of claim 19, further comprising performing a clean-up process a clean-up process for each store, whereby particles that exist in the store are identified as having expired, whereby particles of data and particles of expired data co-exist in the store.

22. The non-transitory computer program product of claim 19, further comprising identifying a persistence policy for storage of the data in accordance with input preferences, whereby a set of store is selected for storage of the data in accordance with the persistence policy.

23. The non-transitory computer program product of claim 19, further comprising destroying all copies of original data after a user-specified time, without any user intervention.

* * * * *